United States Patent
Bharucha et al.

(10) Patent No.: US 11,845,561 B2
(45) Date of Patent: Dec. 19, 2023

(54) VERTICAL STABILIZER FOR EJECTION SYSTEMS

(71) Applicant: AMI Industries, Inc., Colorado Springs, CO (US)

(72) Inventors: Nicholas Kersi Charles Bharucha, Colorado Springs, CO (US); Steven Andrew Holstine, Peyton, CO (US); Casey Andrew Stribrny, Colorado Springs, CO (US)

(73) Assignee: AMI INDUSTRIES, INC., Colorado Springs, CO (US)

(*) Notice: Subject to any disclaimer, the term of this patent is extended or adjusted under 35 U.S.C. 154(b) by 225 days.

(21) Appl. No.: 17/206,551

(22) Filed: Mar. 19, 2021

(65) Prior Publication Data
US 2021/0331810 A1     Oct. 28, 2021

Related U.S. Application Data

(60) Provisional application No. 63/015,203, filed on Apr. 24, 2020.

(51) Int. Cl.
    *B64D 25/10*     (2006.01)

(52) U.S. Cl.
    CPC .................... *B64D 25/10* (2013.01)

(58) Field of Classification Search
    CPC .................................................. B64D 25/10
    See application file for complete search history.

(56) References Cited

U.S. PATENT DOCUMENTS

| | | | | |
|---|---|---|---|---|
| 1,771,727 | A * | 7/1930 | Braun | B64D 25/08 |
| | | | | 267/136 |
| 2,829,850 | A | 4/1958 | Culver | |
| 3,015,462 | A | 1/1962 | Simmons et al. | |
| 4,319,723 | A | 3/1982 | Schultz | |
| 4,480,806 | A | 11/1984 | Duncan | |
| 4,721,273 | A * | 1/1988 | Trikha | B64D 25/10 |
| | | | | 244/141 |
| 4,749,153 | A | 6/1988 | Herndon | |
| 4,901,951 | A * | 2/1990 | Tran | B64D 25/10 |
| | | | | 244/122 A |
| 6,114,976 | A * | 9/2000 | Vian | B64D 25/10 |
| | | | | 340/963 |
| 11,390,389 | B2 * | 7/2022 | Dunst | G05B 19/0428 |

(Continued)

FOREIGN PATENT DOCUMENTS

EP     0260354 A1 *    9/1986    ......... B64D 25/10

OTHER PUBLICATIONS

United Kingdom Intellectual Patent Office, United Kingdom Search Report dated Sep. 17, 2021 in Application No. GB2105815.1.
(Continued)

*Primary Examiner* — Brady W Frazier
*Assistant Examiner* — Shanna Danielle Glover
(74) *Attorney, Agent, or Firm* — SNELL & WILMER L.L.P.

(57) ABSTRACT

A stabilizer system for an ejection seat may comprise a collapsible support structure configured to be coupled to a seat back or a seat bucket of the ejection seat, an airfoil coupled to the collapsible support structure, and a deployment system operatively coupled to the collapsible support structure and configured to expand the collapsible support structure.

19 Claims, 8 Drawing Sheets

(56) References Cited

U.S. PATENT DOCUMENTS

2017/0297725 A1* 10/2017 Campbell .............. B64D 25/10
2020/0361614 A1* 11/2020 Benjamin .......... G05B 19/0426
2021/0180557 A1*  6/2021 Rodriguez ............. B64D 25/10
2021/0309380 A1* 10/2021 Fahey .................... B64D 25/10
2021/0323684 A1* 10/2021 Wilson .................. B64D 25/10

OTHER PUBLICATIONS

United Kingdom Intellectual Property Office, United Kingdom Office Action dated Aug. 3, 2023 in Application No. GB2015815.1.

* cited by examiner

VERTICAL STABILIZER FOR EJECTION SYSTEMS

CROSS-REFERENCE TO RELATED APPLICATIONS

This application claims priority to, and the benefit of, Provisional Patent Application No. 63/015,203, filed Apr. 24, 2020 and titled "VERTICAL STABILIZER FOR EJECTION SYSTEMS," which is incorporated by reference herein in its entirety for all purposes.

FIELD

The present disclosure relates to escape systems, and more specifically, to ejection seats including vertical stabilizing systems.

BACKGROUND

Ejection systems are designed to expel pilots from an aircraft cockpit. Ejection seats in high performance aircraft benefit from safely removing the pilot or other occupant from the stricken aircraft across a wide variety of aircraft speed regimes, altitudes and aircraft attitudes. During ejection, the ejection seat and the occupant encounter a windblast as the canopy is removed and the seat exits the cockpit. The pressure imparted by the wind blast is extreme and tends to move the seat and occupant in an uncontrolled trajectory due to the prevailing windblast velocity vector. As a result, the ejection seat may be disposed at an unstable trajectory (e.g., pitch, roll, yaw) and, thereby, pose a hazard to the occupant due to physical injury that may occur.

SUMMARY

In various embodiments, a stabilizer system for an ejection seat comprises a collapsible support structure configured to be coupled to a seat back or a seat bucket of the ejection seat, an airfoil coupled to the collapsible support structure, and a deployment system operatively coupled to the collapsible support structure and configured to expand the collapsible support structure.

In various embodiments, the airfoil comprises one of a symmetrical or an asymmetrical airfoil. In various embodiments, the deployment system includes at least one of a spring, a linear actuator, or a gas piston. In various embodiments, the collapsible support structure includes at least one of a frangible retention element or a retractable retention element. In various embodiments, the deployment system is configured to communicate with a controller. In various embodiments, the deployment system is configured to receive power from the ejection seat. In various embodiments, the deployment system is operatively coupled to an ordnance system.

In various embodiments, a control system for an ejection system comprises an ejection seat including a collapsible support structure coupled to at least one of a seat back or a seat bucket of the ejection seat, an airfoil coupled to the collapsible support structure, a deployment system operatively coupled to the collapsible support structure and configured to expand the collapsible support structure, a canopy jettison system, a sensor, a controller, and a tangible, non-transitory memory configured to communicate with the controller, the tangible, non-transitory memory having instructions stored thereon that, in response to execution by the controller, cause the controller to perform operations comprising receiving an eject command, polling the sensor for sensor data, receiving the sensor data, passing the sensor data to a deployment logic, determining via the deployment logic a deployment time based on the sensor data, actuating, and actuating the deployment system at the deployment time.

In various embodiments, the operations further comprise receiving a mode select command from a control interface, passing the mode select command to a mode select logic, determining via the mode select logic an ejection mode, passing the ejection mode to the deployment logic, selecting via the deployment logic the deployment time based on the ejection mode, and actuating at least one of the deployment system or the canopy jettison system based on the ejection mode. In various embodiments, the operations further comprise rotating a rotable component of an ordnance device, and enabling pyrotechnic communication with the deployment system based on the rotation of the rotable component. In various embodiments, the operations further comprise actuating the canopy jettison system. In various embodiments, the deployment logic comprises a lookup table of an ejection seat cockpit clearance time indexed to the sensor data. In various embodiments, the sensor data includes at least one of a velocity, an airspeed, an altitude, an aircraft orientation, or an atmospheric condition. In various embodiments, the sensor and the controller are integrated onboard the ejection seat.

In various embodiments, a method of actuating an ejection system may comprise receiving an eject command, actuating an ejection seat, and actuating a deployment system of a stabilizer system for the ejection seat, wherein the stabilizer system includes a collapsible support structure coupled to at least one of a seat back or a seat bucket of the ejection seat, an airfoil coupled to the collapsible support structure, wherein the deployment system is operatively coupled to the collapsible support structure and configured to expand the collapsible support structure, and expanding via the deployment system the collapsible support structure.

In various embodiments, the method includes polling a sensor for sensor data, receiving the sensor data, passing the sensor data to a deployment logic, determining via the deployment logic a deployment time based on the sensor data, and actuating the deployment system at the deployment time. In various embodiments, the method includes receiving a mode select command from a control interface, passing the mode select command to a mode select logic, determining via the mode select logic an ejection mode, passing the ejection mode to the deployment logic, selecting via the deployment logic the deployment time based on the ejection mode, and actuating at least one of the deployment system or the canopy jettison system based on the ejection mode. In various embodiments, the method includes, rotating a rotable component of an ordnance device, and enabling pyrotechnic communication with the deployment system based on the rotation of the rotable component. In various embodiments, the method includes actuating a canopy jettison system. In various embodiments, the sensor data includes at least one of a velocity, an airspeed, an altitude, an aircraft orientation, or an atmospheric condition.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
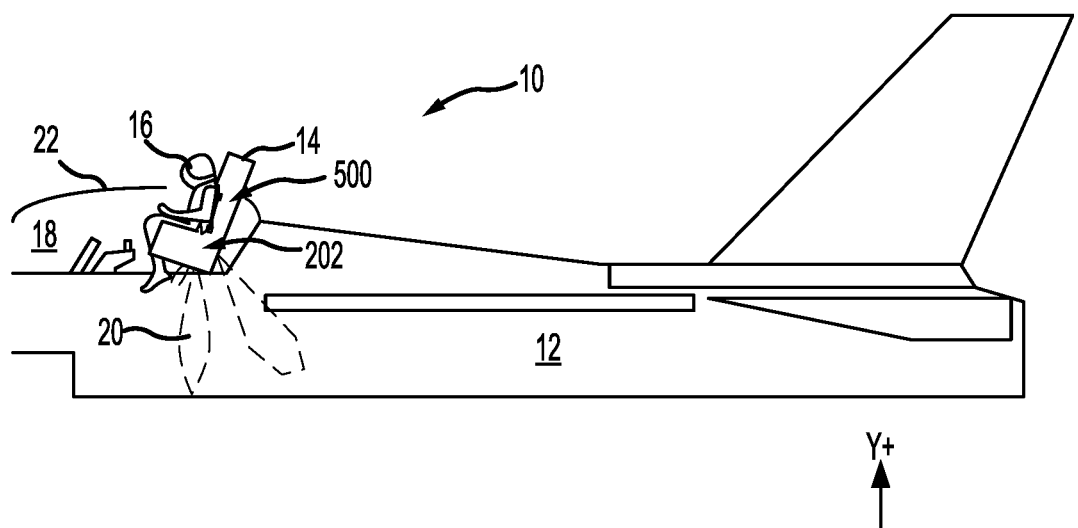
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20 such as, for example, a rocket catapult system included in the ejection seat 14. In this regard, ejection seat 14 may be configured to extract the ejection seat 14 from cockpit 18. Ejection system 10 includes a stabilizer system 500 which may be integrated with the ejection seat 14. Ejection system 10 includes a canopy jettison system configured to remove the canopy 22 of the cockpit 18. In various embodiments, an ejector system controller 202 (i.e., controller) configured to control ejection system 10 elements may be included aboard the aircraft 12 and/or the ejection seat 14.

Figure 1B:
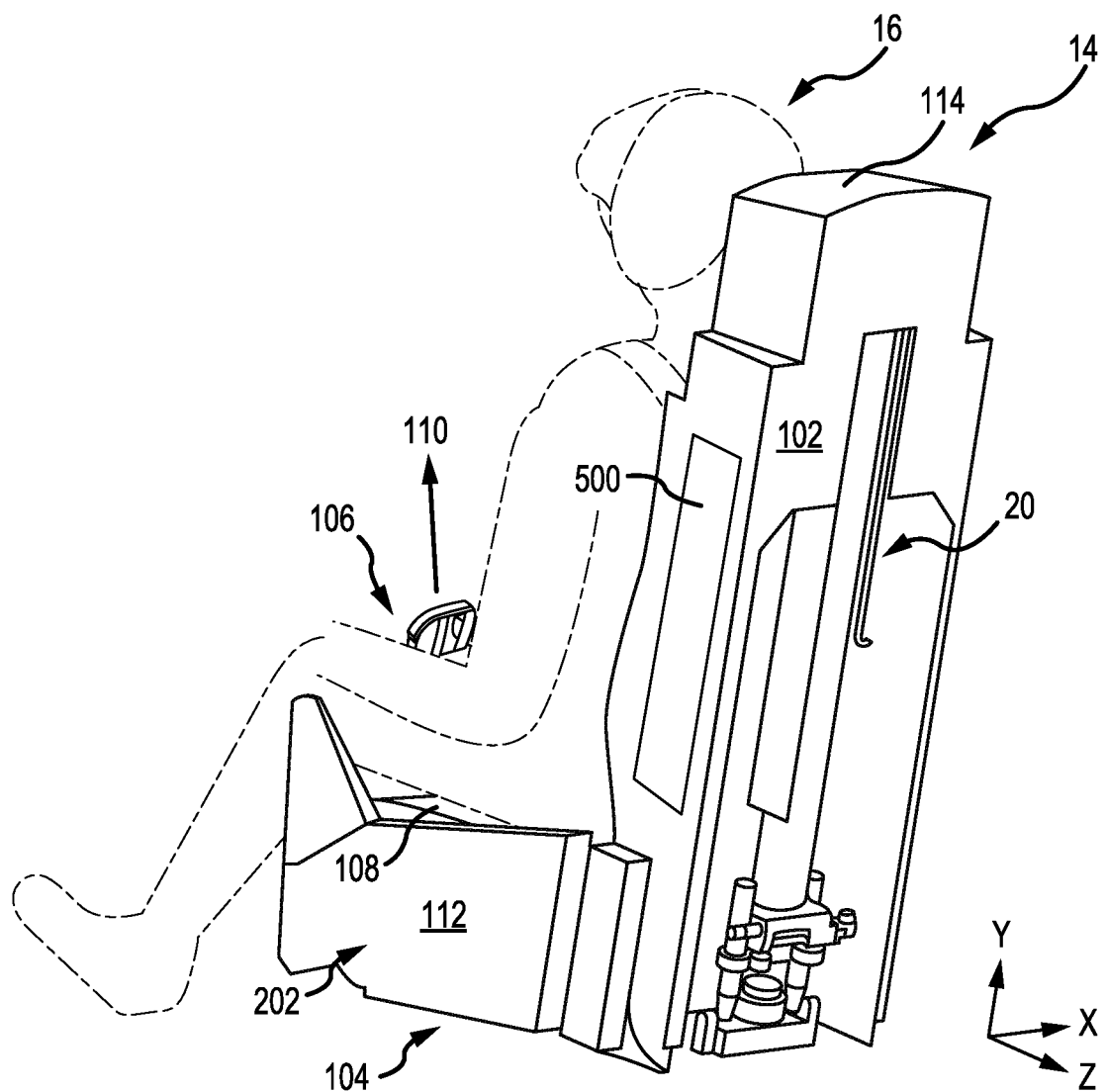
FIG. 1B illustrates an ejection seat of an aircraft ejection system including a stabilizer system, in accordance with various embodiments.

With additional reference to FIG. 1B, ejection seat 14 is illustrated with propulsion system 20 in an inactive state, in accordance with various embodiments. Ejection seat 14 includes a seat back 102 and a seat bucket 104. The propulsion system 20 is coupled to seat back 102. In various embodiments, an ejection handle 106 may be located proximate a front 108 of seat bucket 104. Front 108 of seat bucket 104 is generally opposite, or distal, seat back 102. While FIG. 1B shows ejection handle 106 located at front 108 of seat bucket 104, it is further contemplated and understood that ejection handle 106 may be located anywhere that is accessible to an occupant of ejection seat 14. For example, ejection handle 106 may be located on a side 112 of seat bucket 104 or a headrest 114 of seat back 102.

In various embodiments, the controller 202 may be located in the seat bucket 104 or the seat back 102 of the ejection seat 14. Ejection handle 106 may be configured to initiate an ejection sequence upon actuation. For example, occupant 16 pulling ejection handle 106 in the direction of arrow 110 may activate the propulsion system 20 and/or may provide control signals to the controller 202. In this regard, pulling ejection handle 106 may cause separation of the canopy 22 and cause ejection seat 14 to be expelled from cockpit 18. The ejection seat 14 includes a stabilizer system 500 which may be integrated into the seat back 102 and/or a side 112 of the seat bucket 104. The stabilizer system 500 is configured to deploy laterally (along the X-axis) therefrom. In response to deployment, the stabilizer system 500 may provide an airfoil configured as a vertical stabilizer relatively parallel the YZ plane.

Figure 5A:
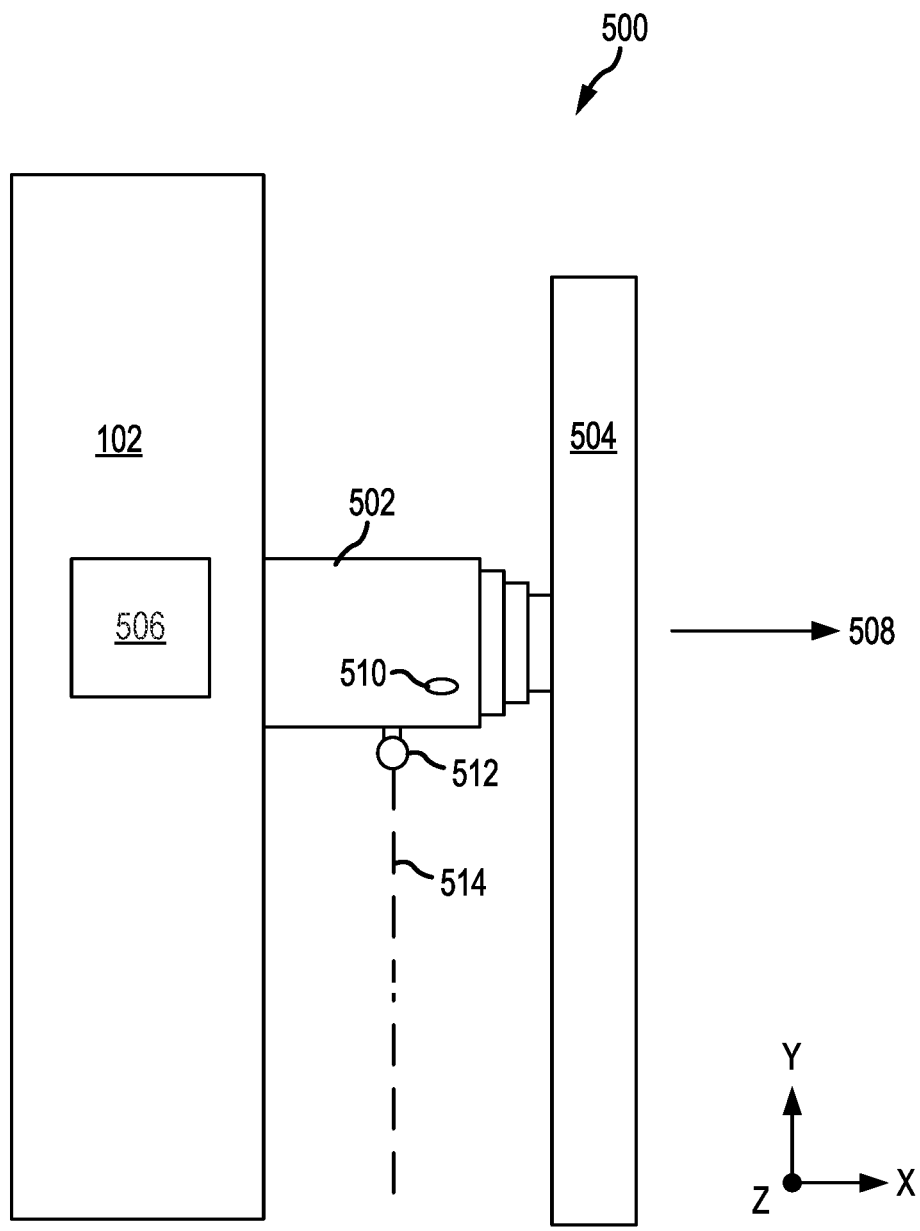
FIG. 5A illustrates a stabilizer system for an ejection seat, in accordance with various embodiments.

In various embodiments and with reference now to FIG. 5A, stabilizer system 500 is illustrated as viewed along the Z axis toward the seat back 102. Stabilizer system 500 includes a collapsible support structure 502, an airfoil 504, and a deployment system 506. Airfoil 504 is coupled to the collapsible support structure 502. In various embodiments, the airfoil 504 comprises one of a symmetrical or an asymmetrical airfoil 504 held relatively vertical in the YZ plane by the collapsible support structure 502. In various embodiments, the airfoil 504 may be tuned to keep the center of pressure (CP) of the combined ejection seat 14 and occupant 16 within zero to five inches, or within two to five inches, or within three to four inches of the respective combined center of gravity (CG). Stated another way, the airfoil 504 may be tuned to maintain ±2 in. of CP shift along the pitch and yaw axes from the CG. The collapsible support structure 502 may be configured to couple to the seat back 102 and/or the seat bucket 104 of the ejection seat 14. In various embodiments, the collapsible support structure 502 may be a telescoping structure and/or a scissors type structure.

Stabilizer system 500 includes a deployment system 506 operatively coupled to the collapsible support structure 502 and configured to expand the collapsible support structure 502. The deployment system 506 may be configured to communicate with a controller. For example, the deployment system may comprise a gas generator and/or gas piston which may expand (i.e., drive) the collapsible support structure 502 relatively outward along the X-axis as indicated by arrow 508. In various embodiments, the collapsible support structure 502 may include one of a frangible retention element 510 such as one of a frangible joint, an explosive bolt, a shear rivet, or shear pin, and/or the like. The frangible retention element 510 may tend to retain the collapsible support structure 502 in the collapsed condition until sufficient driving force is imparted by the deployment system 506. In various embodiments, the deployment system may include a linear actuator configured to receive power from the ejection seat 14.

In various embodiments, the deployment system 506 may include a spring. In various embodiments, the spring may be partially enclosed within the collapsible support structure 502. The spring may be compressed when the collapsible support structure 502 is in the collapsed condition. The collapsible support structure 502 may include retractable retention element configured to retain the collapsible support structure 502 in the collapsed condition such as, for example, a lanyard-pull pin 512. In this regard, the lanyard-pull pin 512 may be configured to maintain the spring compression. In various embodiments, the spring may comprise a coil spring, a torsion spring, a leaf spring, and/or any other suitable spring know to those skilled in the art.

In response to actuation of the ejection seat, the ejection seat may depart the cockpit 18 of the aircraft 12. A lanyard 514 may be coupled to the lanyard-pull pin 512 at a first end and to the aircraft at a second end. In this regard, the lanyard-pull pin 512 may be removed from the collapsible support structure 502 in response to the ejection seat 14 departing the cockpit 18. In response, the deployment system may be actuated to expand the collapsible support structure 502 and extend the airfoil 504. In various embodiments, the second end of the lanyard 514 may be coupled to an ordnance device and/or mechanical device aboard the ejection seat 14 which may withdraw the lanyard-pull pin 512 in response to an actuation signal. In various embodiments, the mechanical actuation device may include, for example, a bell crank configured to withdraw the lanyard-pull pin 512 in response to an actuation signal. It will be appreciated by those skilled in the art that the frangible retention element 510 may be configured to maintain the spring compression, for example an explosive bolt or a frangible joint may be actuated in response to an actuation signal generated by a controller in response to the ejection seat 14 departing the cockpit 18.

Figure 5B:
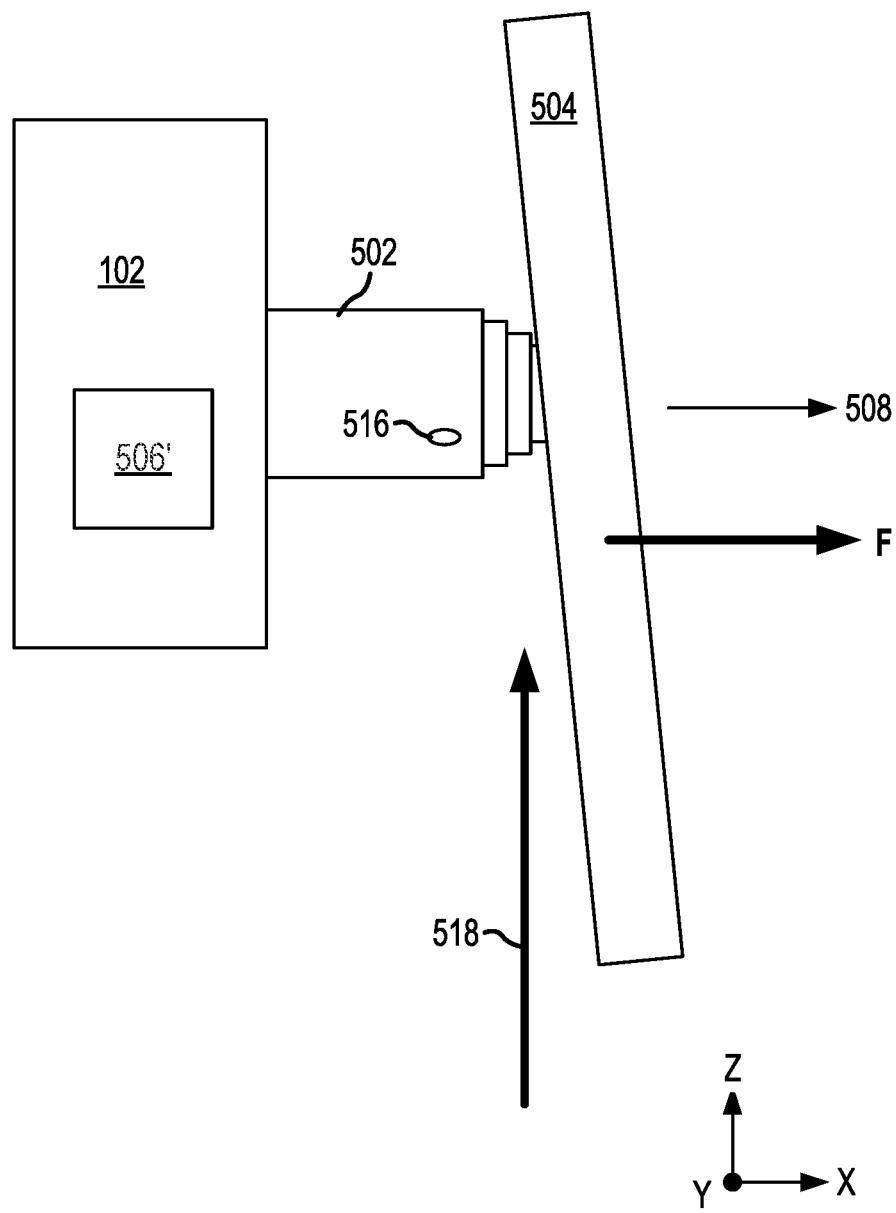
FIG. 5B illustrates a stabilizer system for an ejection seat, in accordance with various embodiments.

With additional reference to FIG. 5B, stabilizer system 500 is illustrated as viewed along the Y axis toward the top of seat back 102. A deployment system 506' may comprise a frangible retention element and/or a retractable retention element and an anti-collapse element 516. In various embodiments, the anti-collapse element 516 may comprise a spring loaded locking pin configured to retain the collapsible support structure 502 in an expanded condition. It will be appreciated that an anti-collapse element 516 may comprise any suitable feature such as a locking ring, a friction fitting, expanding collet, and/or any other suitable feature configured to inhibit collapse of the collapsible support structure 502 in response to aerodynamic loads associated with the ejection event (i.e. actuation of the ejection seat and departure from the cockpit 18 of aircraft 12). In various embodiments, the airfoil 504 may be coupled at a non-zero angle of attack relative to the wind blast vector 518 associated with the ejection event. In various embodiments, the relative angle of attach may be greater than 0° but less than 15°, or may between 0.5° and 15°, or may be between 1° and 10°, or may be between 3° and 7°.

In response to the ejection event, the wind blast vector 518 may induce a lift force F proportional to the relative angle of attack of the airfoil 504. The lift force F may tend to drive the collapsible support structure 502 outward along the X-axis as indicated by arrow 508. In various embodiments, the lift force F may overcome a retention force of the frangible retention element and/or may actuate the anti-collapse element 516. For example, the lift force F may expand the collapsible support structure 502 and cause a spring loaded locking pin to align with a locking aperture, and thereby dispose the spring loaded locking pin through the aperture. In various embodiments, an interference between the spring loaded locking pin and the aperture may tend to retain the collapsible support structure 502 in the expanded condition. In this regard the deployment system 506' may be configured to expand and retain the collapsible support structure 502.

Figure 2:
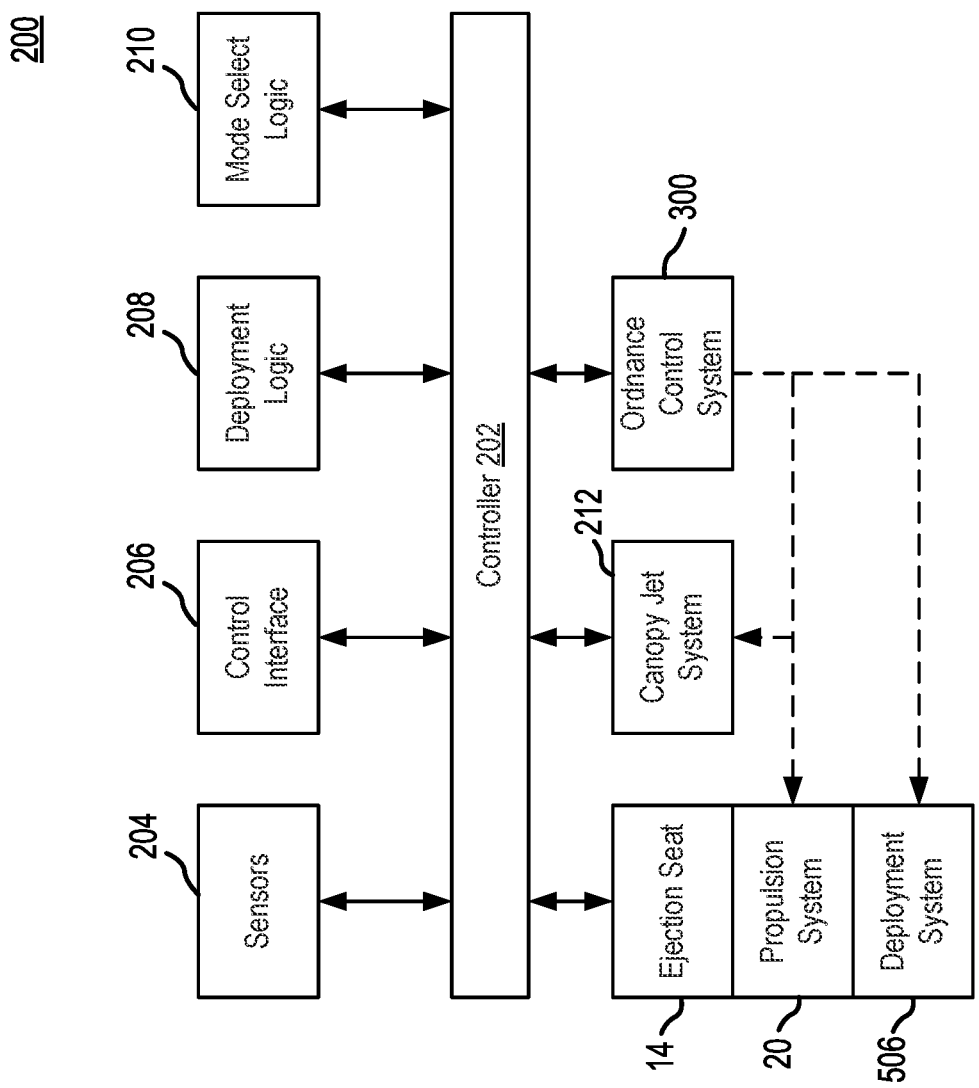
FIG. 2 illustrates a block diagram of a control system of an ejection system, in accordance with various embodiments.

With additional reference to FIG. 2, a block diagram of a control system 200 of ejection system 10 is illustrated in accordance with various embodiments. Each of the system 200 components may be configured to receive operative power (e.g., electrical power, mechanical power, pneumatic power, pyrotechnic power, etc.) independent of aircraft 12. In various embodiments, the controller 202 may be integrated into computer systems onboard the aircraft 12 or may be integrated into the ejection seat 14. Controller 202 may be configured as a central network element or hub to access various systems, engines, and components of system 200. In various embodiments, controller 202 may comprise a processor. In various embodiments, controller 202 may be implemented in a single processor. In various embodiments, controller 202 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 202 may comprise a processor configured to implement various logical operations in response to execution of instructions, for example, instructions stored on a non-transitory, tangible, computer-readable medium configured to communicate with controller 202.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, system 200 includes controller 202, one or more sensors 204, a control interface 206, a deployment logic 208, a mode select logic 210, a canopy jettison system 212, the ejection seat 14, propulsion system 20, a deployment system 506, and an ordnance control system 300. Each of these systems may be in logical and/or operable communication with the controller 202. The controller 202 may be in electronic communication with the full suite of aircraft sensors and other data sources available within and without the aircraft such as, for example, GPS, radio beacons, remote commands and the like.

In various embodiments, sensors 204 may comprise a temperature sensor, a torque sensor, a speed sensor, a pressure sensor, a position sensor, an accelerometer, a pitot tube, a gyroscope, or any other suitable measuring device known to those skilled in the art. In various embodiments, one or more of the sensors 204 (e.g., a pitot tube) may be integrated aboard the ejection seat 14. Sensors 204 may be configured to measure a characteristic the aircraft 12 or aircraft and ejection system 10 components. Sensors 204 may be configured to transmit the measurements to controller 202, thereby providing sensor feedback about the system to controller 202. The sensor feedback may be, for example, a speed signal, or may be position feedback, temperature feedback, pressure feedback or other data. In various embodiments, the sensors 204 may provide sensor data including a velocity, an airspeed, an altitude, an aircraft orientation, an atmospheric condition, and/or other characteristics.

In various embodiments, the control interface 206 may comprise controls operable by the occupant 16 and provide communication with the controller 202. The control interface may comprise, for example, the ejection handle 106 and/or one or more, switches, dials, displays, buttons, pins, and/or the like. System 200 includes a canopy jettison system 212 operable by the controller 202 and configured to remove the canopy 22 from the cockpit 18 of the aircraft 12. In like regard, the ejection seat and propulsion system 20 are configured to egress from the aircraft 12 in response controller 202 receiving an eject command. In this regard the controller 202 may be configured to actuate the canopy jettison system and the ejection seat.

In various embodiments, the canopy jettison system 212, the deployment system 506, and/or the propulsion system 20 may be pyrotechnically actuated and be in pyrotechnic communication (dashed lines) with an ordnance control system 300. The ordnance control system 300 may comprise one or more ordnance devices operable by the controller 202 such as, for example, safe and arm devices, pyrotechnic delay devices, ordnance communications devices, gas generators, electro-explosive devices, explosive bolts, and/or the like.

In various embodiments, controller 202 may include a deployment logic 208 and a mode select logic 210. In various embodiments, the deployment logic 208 may comprise a lookup table of an ejection seat cockpit clearance time indexed to the sensor data. For example, an array of ejection seat cockpit clearance times may be indexed to an array of airspeeds, aircraft velocities, aircraft orientations, and/or the like. The deployment logic 208 may output a deployment time in response to the sensor data. In this regard, the deployment logic 208 may enable the controller 202 to determine a deployment time based on the sensor data. In various embodiments, the controller 202 may actuate the deployment system at the deployment time. In this regard, the control system 200 tends to inhibit premature initiation of the deployment system 506 and thereby preclude unintended contact of the stabilizer system 500 airfoil with the cockpit.

In various embodiments, the mode select logic 210 may be configured to determine an ejection mode based on sensor data. For example, the mode select logic may determine between alternative ejection seat 14 egress modes such as a canopy jettison mode or a canopy fracture mode based on aircraft characteristics such as altitude, airspeed, and orientation. In various embodiments, the mode select logic may determine the ejection mode in response to a mode select command. Controller 202 may receive the mode select command from the control interface 206 and pass the mode select command to the mode select logic 210. In various embodiments, the controller 202 may pass the ejection mode to the deployment logic 208. The time delay logic may include a static or subset of time delays indexed to the ejection mode. In this regard, the controller 202 may select, via the deployment logic 208, the time delay based on the ejection mode. In like regard, the controller 202 may actuate the canopy jettison system based on the ejection mode. In this regard, the control system 200 tends to inhibit premature initiation of the deployment system 506 and thereby preclude unintended contact of the stabilizer system 500 airfoil with the canopy.

Figure 3:
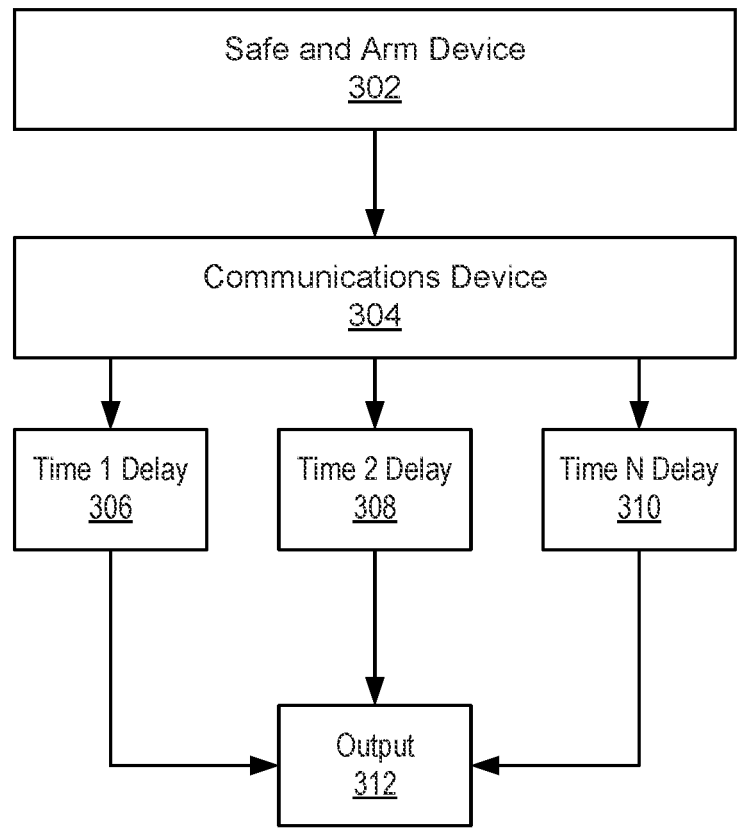
FIG. 3 illustrates a block diagram of an ordnance system, in accordance with various embodiments.

In various embodiments and with additional reference to FIG. 3, a block diagram of an ordnance system such as ordnance control system 300 is illustrated. Ordnance control system 300 includes a safe and arm device 302, a communications device 304, and a plurality of pyrotechnic time delays e.g., a first time delay 306, a second time delay 308, and an Nth time delay 310. The safe and arm device 302 may be configured to receive an actuation command from the controller 202 and, in response, provide a pyrotechnic signal to the communications device 304. The communications device 304 may be configured to be controlled by the controller 202. The communications device 304 may select among the plurality of pyrotechnic time delays and enable pyrotechnic communication between the safe and arm device 302 and the selected pyrotechnic time delay such as, for example, the second time delay 308. The second time delay 308 may delay the pyrotechnic signal from the safe and arm device 302 and an output 312 such as, for example, an ordnance transmission line in communication with the propulsion system 20, the deployment system, and/or the canopy jettison system 212.

Figure 4:
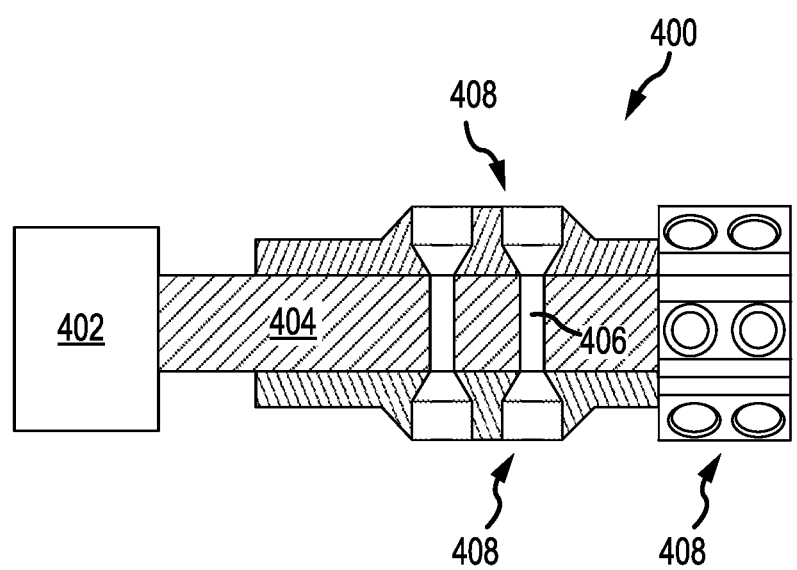
FIG. 4 illustrates an ordnance device of an ordnance system, in accordance with various embodiments.

In various embodiments and with additional reference to FIG. 4, an ordnance device 400 such as, for example, a safe and arm device or a communications device is illustrated. Ordnance device 400 includes an actuation module 402, a rotable component 404, and one or more communication channels 406. The actuation module 402 may be an electrical, mechanical, electromechanical, pneumatic, or other motor driven device in communication with the controller 202. The actuation module 403 may be configured to rotate the rotable component 404 to a predetermined position based on commands from the controller 202. For example, there may be a plurality of predetermined positions which align to allow one or more of the communications channels 406 with corresponding input/output ports 408 to enable pyrotechnic communication between ordnance system components such as, for example, between the safe and arm device 302 and the deployment system 506. Although illustrated as gas channels, it will be appreciated that the communications channels may be electrical, ballistic, pneumatic, and/or any other suitable means for communicating an actuation signal between the controller 202 and actuatable ejection system 10 components (e.g., ejection seat 14, propulsions system 20, deployment system 506, and/or canopy jettison system 212). In this regard, the controller 202 may rotate the rotable component 404 of the ordnance device 400 and enable pyrotechnic communication with deployment system 506 based on the rotation of the rotable component. Stated another way, the controller may select a pyrotechnic communication channel corresponding to the deployment time calculated by the deployment logic. In various embodiments, the rotable component 404 may be configured to withdraw the lanyard-pull pin 512 in response to rotating.

Figure 6:
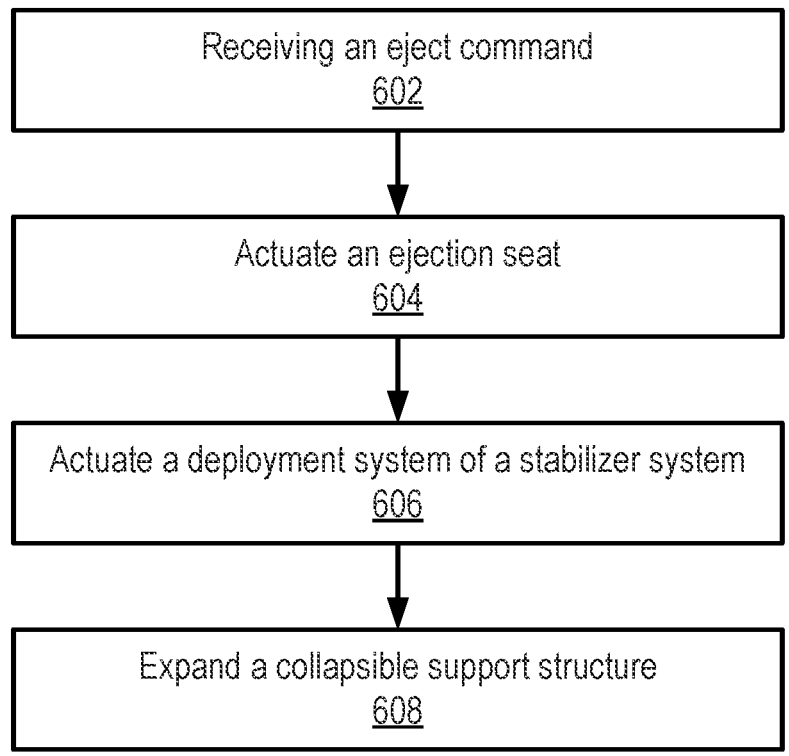
FIG. 6 illustrates a method of actuating an ejection system, in accordance with various embodiments.

In various embodiments and with additional reference to FIG. 6, a method 600 of actuating an ejection system 10 is illustrated. Method 600 includes controller 202 receiving an eject command (step 602). For example, controller 202 may receive the eject command from the control interface 206 via ejection handle 106. Controller 202 may actuate the ejection seat 14 in response to the eject command (step 604). In response to the ejection seat 14 departing the cockpit 18, controller 202 may actuate the deployment system 506 of the stabilizer system 500 (step 606). In this regard, the controller 303 may expand the collapsible support structure 502 (step 608).

Method 600 includes controller 202 polling the sensors 204 for sensor data and thereby checking the status of the sensors 204 for data integrity. Controller 202 may receive sensor data from the sensors 204. For example, the controller may receive velocity data from a pitot tube integral to the ejection seat 14. Controller 202 may pass the sensor data to the deployment logic 208. Controller 202 may determine via the deployment logic 208 a deployment time based on the sensor data. For example, the controller may compute the deployment time based on a lookup table of ejection seat cockpit clearance time and velocity. The controller may select a deployment time after canopy 22 separation and ejection seat 14 extraction from the cockpit 18 or after the ejection seat 14 has penetrated through the canopy 22.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stabilizer system for an ejection seat, comprising:
   a collapsible support structure configured to be coupled to a seat back of the ejection seat, wherein the collapsible support structure includes at least one of a frangible retention element or a retractable retention element;
   an airfoil coupled to the collapsible support structure; and
   a deployment system operatively coupled to the collapsible support structure and configured to expand the collapsible support structure, wherein the at least one of the frangible retention element or the retractable retention element is configured to retain the collapsible support structure in a collapsed condition until the deployment system imparts a driving force to expand the collapsible support structure.

2. The stabilizer system for an ejection seat of claim 1, wherein the airfoil comprises at least one of a symmetrical or an asymmetrical airfoil.

3. The stabilizer system for an ejection seat of claim 1, wherein the deployment system includes at least one of a spring, a linear actuator, or a gas piston.

4. The stabilizer system for an ejection seat of claim 1, wherein the deployment system is configured to communicate with a controller.

5. The stabilizer system for an ejection seat of claim 1, wherein the deployment system is configured to receive power from the ejection seat.

6. The stabilizer system for an ejection seat of claim 1, wherein the deployment system is operatively coupled to an ordnance system.

7. A control system for an ejection system, comprising:
   an ejection seat including a collapsible support structure coupled to a seat back of the ejection seat, wherein the collapsible support structure includes at least one of a frangible retention element or a retractable retention element;
   a deployment system operatively coupled to the collapsible support structure and configured to expand the collapsible support structure, wherein the at least one of the frangible retention element or the retractable retention element is configured to retain the collapsible support structure in a collapsed condition until the deployment system imparts a driving force to expand the collapsible support structure;
   a canopy jettison system;
   a sensor;
   a controller; and
   a tangible, non-transitory memory configured to communicate with the controller, the tangible, non-transitory memory having instructions stored thereon that, in response to execution by the controller, cause the controller to perform operations comprising:
receiving, by the controller, an eject command;
polling, by the controller, the sensor for a sensor data;
receiving, by the controller, the sensor data;
passing, by the controller, the sensor data to a deployment logic;
determining, by the controller and via the deployment logic, a deployment time based on the sensor data;
actuating, by the controller, the ejection seat; and
actuating, by the controller, the deployment system at the deployment time.

8. The control system for an ejection system of claim 7, wherein the operations further comprise:
receiving, by the controller, a mode select command from a control interface;
passing, by the controller, the mode select command to a mode select logic;
determining, by the controller and via the mode select logic, an ejection mode;
passing, by the controller, the ejection mode to the deployment logic;
selecting, by the controller and via the deployment logic, the deployment time based on the ejection mode; and
actuating, by the controller, at least one of the deployment system or the canopy jettison system based on the ejection mode.

9. The control system for an ejection system of claim 7, wherein the operations further comprise:
rotating, by the controller, a rotable component; and
enabling, by the controller, pyrotechnic communication with the deployment system based on the rotation of the rotable component.

10. The control system for an ejection system of claim 7, wherein the operations further comprise actuating, by the controller, the canopy jettison system.

11. The control system for an ejection system of claim 7, wherein the deployment logic comprises a lookup table of an ejection seat cockpit clearance time indexed to the sensor data.

12. The control system for an ejection system of claim 7, wherein the sensor data includes at least one of a velocity, an airspeed, an altitude, an aircraft orientation, or an atmospheric condition.

13. The control system for an ejection system of claim 7, wherein the sensor and the controller are integrated onboard the ejection seat.

14. A method of actuating an ejection system, comprising:
receiving, by a controller, an eject command;
actuating, by the controller, an ejection seat; and
actuating, by the controller, a deployment system of a stabilizer system for the ejection seat, wherein the stabilizer system includes a collapsible support structure coupled to a seat back of the ejection seat, wherein the collapsible support structure includes at least one of a frangible retention element or a retractable retention element,
wherein the deployment system is operatively coupled to the collapsible support structure and configured to expand the collapsible support structure, wherein the at least one of the frangible retention element or the retractable retention element is configured to retain the collapsible support structure in a collapsed condition until the deployment system imparts a driving force to expand the collapsible support structure; and
expanding, by the controller and via the deployment system, the collapsible support structure.

15. The method of claim 14, further comprising:
polling, by the controller, a sensor for a sensor data;
receiving, by the controller, the sensor data;
passing, by the controller, the sensor data to a deployment logic;
determining, by the controller and via the deployment logic, a deployment time based on the sensor data; and
actuating, by the controller, the deployment system at the deployment time.

16. The method of claim 15, further comprising:
receiving, by the controller, a mode select command from a control interface;
passing, by the controller, the mode select command to a mode select logic;
determining, by the controller and via the mode select logic, an ejection mode;
passing, by the controller, the ejection mode to the deployment logic; and
selecting, by the controller and the deployment logic, the deployment time based on the ejection mode.

17. The method of claim 14, further comprising:
rotating, by the controller, a rotable component; and
enabling, by the controller, pyrotechnic communication with the deployment system based on the rotation of the rotable component.

18. The method of claim 14, further comprising actuating, by the controller, a canopy jettison system.

19. The method of claim 15, wherein the sensor data includes at least one of a velocity, an airspeed, an altitude, an aircraft orientation, or an atmospheric condition.

* * * * *